(12) United States Patent
Gu et al.

(10) Patent No.: US 12,059,652 B2
(45) Date of Patent: Aug. 13, 2024

(54) Fe—Al-BASED METAL MEMBRANE AND PREPARATION METHOD THEREOF

(71) Applicant: AT&M ENVIRONMENTAL ENGINEERING TECHNOLOGY CO., LTD., Beijing (CN)

(72) Inventors: Hu Gu, Beijing (CN); Junjun Yang, Beijing (CN); Fan Wang, Beijing (CN); Guanying Liu, Beijing (CN); Yu Zhang, Beijing (CN); Ying Dai, Beijing (CN); Xuan Yang, Beijing (CN); Kun Wang, Beijing (CN); Shiyu Lin, Beijing (CN)

(73) Assignee: AT&M ENVIRONMENTAL ENGINEERING TECHNOLOGY CO., LTD., Beijing (CN)

( * ) Notice: Subject to any disclaimer, the term of this patent is extended or adjusted under 35 U.S.C. 154(b) by 148 days.

(21) Appl. No.: 17/791,496

(22) PCT Filed: Jun. 4, 2020

(86) PCT No.: PCT/CN2020/094404
§ 371 (c)(1),
(2) Date: Jul. 7, 2022

(87) PCT Pub. No.: WO2021/189661
PCT Pub. Date: Sep. 30, 2021

(65) Prior Publication Data
US 2023/0074526 A1 Mar. 9, 2023

(30) Foreign Application Priority Data
Mar. 21, 2020 (CN) .......................... 202010204536.0

(51) Int. Cl.
*B01D 53/22* (2006.01)
*B01D 46/54* (2006.01)
(Continued)

(52) U.S. Cl.
CPC ....... *B01D 67/0046* (2013.01); *B01D 46/543* (2013.01); *B01D 67/0083* (2013.01); *B01D 69/108* (2022.08); *B01D 71/022* (2013.01)

(58) Field of Classification Search
CPC .............. B01D 46/543; B01D 67/0046; B01D 69/108; B01D 71/022; B01D 67/0083
See application file for complete search history.

(56) References Cited

U.S. PATENT DOCUMENTS 5,342,514 A * 8/1994 Turner ................... B01D 35/06
210/243
5,523,183 A * 6/1996 Koehler .................. H01M 4/80
429/235
(Continued)

FOREIGN PATENT DOCUMENTS

CN 1608772 A 4/2005
CN 101249389 A 8/2008
(Continued)

OTHER PUBLICATIONS

International Search Report of PCT/CN2020/094404.
Written Opinion of PCT/CN2020/094404.

*Primary Examiner* — Anthony R Shumate

(57) ABSTRACT

The present invention discloses a Fe—Al-based metal membrane and preparation method thereof, which relate to the technical field concerning gas-solid separation under high-temperature, low-pressure working conditions, and mainly address the defects of conventional metal filter elements in the prior art such as high filtration resistance and low flux under low-pressure working environments. The preparation method of the present invention comprises the steps of: stirring and defoaming a mixture composed of a Fe—Al-based metal powder and an organic-additive-added water-based solvent, thus obtaining a cast slurry; casting a uniform membrane layer on a metal substrate layer having a required (Continued)

thickness on a casting machine, and performing drying treatment on it, thus obtaining a membrane green body; and, placing the dried membrane green body in a sintering furnace for degreasing, sintering, and alloy phase ordering treatments, respectively, thus obtain a prepared Fe—Al-based metal membrane.

5 Claims, 1 Drawing Sheet

(51) Int. Cl.
  *B01D 67/00* (2006.01)
  *B01D 69/10* (2006.01)
  *B01D 71/02* (2006.01)

(56) References Cited

U.S. PATENT DOCUMENTS

| | | | | |
|---|---|---|---|---|
| 5,814,118 | A * | 9/1998 | Wickland | B01D 46/0012 55/525 |
| 5,976,708 | A * | 11/1999 | Oosumi | C23C 28/021 428/685 |
| 6,681,648 | B1 * | 1/2004 | Dye | B01D 65/109 96/417 |
| 9,150,733 | B2 * | 10/2015 | Iandoli Espinosa | C09D 4/00 |
| 11,918,958 | B2 * | 3/2024 | Gu | B01D 71/0223 |
| 2004/0261616 | A1 * | 12/2004 | Jorgensen | B01D 71/62 96/14 |
| 2006/0021502 | A1 * | 2/2006 | Young | B01D 67/0006 95/45 |
| 2011/0253269 | A1 * | 10/2011 | Wei | C21D 6/004 148/599 |
| 2019/0062941 | A1 * | 2/2019 | Li | C25F 7/00 |
| 2023/0032023 | A1 * | 2/2023 | Gu | B01D 67/00411 |
| 2023/0044409 | A1 * | 2/2023 | Gu | B01D 39/12 |

FOREIGN PATENT DOCUMENTS

| | | |
|---|---|---|
| CN | 101439884 A | 5/2009 |
| CN | 101524609 A | 9/2009 |
| CN | 103386486 A | 11/2013 |
| CN | 103695689 A | 4/2014 |
| CN | 105854633 A | 8/2016 |
| CN | 106563630 A | 4/2017 |
| CN | 108079666 A | 5/2018 |
| CN | 110125392 A | 8/2019 |
| CN | 110496967 A | 11/2019 |
| JP | 6372319 A | 4/1988 |
| KR | 200216157 Y1 | 3/2001 |
| KR | 20080058970 A | 6/2008 |

* cited by examiner

Fe—Al-BASED METAL MEMBRANE AND PREPARATION METHOD THEREOF

CROSS-REFERENCE TO RELATED APPLICATIONS

This Application is a national stage application of PCT/CN2020/094404. This application claims priorities from PCT Application No. PCT/CN2020/094404, filed Jun. 4, 2020, and from the Chinese patent application 202010204536.0 filed Mar. 21, 2020, the content of which are incorporated herein in the entirety by reference.

TECHNICAL FIELD

The present disclosure relates to the technical field concerning gas-solid separation under high-temperature, low-pressure operating conditions, and in particular to the technical field involving optimization of performance of iron-aluminum-based (hereinafter referred to as Fe—Al-based) metal membranes and eco-friendly preparation method thereof.

BACKGROUND

Boiler exhaust gas is a type of gas mixture containing soot, $SO_2$, $NO_x$ and other gases emitted from a boiler flue, whose irrational control and substandard emission will seriously pollute atmosphere and degrade atmospheric quality, causing adverse effects on ecological environment and even humankind's future development. At present, the amount of boiler exhaust gas emitted by industrial boilers in China has reached 6-8 Mt per year, accounting for a large proportion of total national soot emissions. Therefore, strengthening control of boiler exhaust gas emissions and effectively reducing content of solid particulate matter in boiler exhaust gas play a crucial role in improving air quality. Boiler exhaust gas is usually generated in a high-temperature, low-pressure operating environment, with its emission having characteristics of a high-flux exhaust gas/process gas flow and low solids content at a flue outlet, thus making removal of soot very difficult.

According to different dust removal mechanisms, dust removal technologies include mechanical dust removal technology, wet dedusting technology, electrostatic precipitator technology and filter dedusting technology. Mechanical dust removal technology utilizes mechanical forces, such as gravity, centrifugal force and inertia force, etc., to separate solid particles from boiler exhaust gas, for instance, cyclone separators. However, due to low dust removal efficiency, it is generally used only as a dust pre-collector in flue gas purification. Wet dedusting technology uses scrubbing liquid to scrub flue gas, which can remove particles above 0.1 μm, but has serious problems in actual dedusting process due to secondary pollution such as wastewater and sludge after scrubbing, as well as corrosion of dedusting equipment. Electrostatic precipitator technology establishes an electric field by corona discharge, which enables particles in soot to collide with charged ions when passing through the electric field and thus become charged and move in a directional manner and thereby realizes a separation process. Electrostatic precipitator technology can withstand high-temperature, high-pressure, high-volume-flue-gas working conditions, with dust removal efficiency up to 99%, but requires highly on dust specific resistance, because too-high specific resistance will cause anti-corona, and too-low specific resistance will cause secondary flutter of dust, both of which will affect separation efficiency of a precipitator, making it difficult to meet emission standards of boiler exhaust gas. Filter dedusting technology uses porous packing layers as filter media and utilizes filtration mechanism to achieve separation and purification, has high dedusting efficiency, can remove dust having high specific resistance, and is widely used in high-accuracy-required gas-solid separation processes, with low equipment and operating costs. Among them, filter-bag dedusting technology is most commonly applied in the field of boiler exhaust gas dedusting.

In filter-bag dedusting technology, filter bags, as core components of a baghouse filter, have been widely studied by industry experts regarding their filter media selection. At an earliest stage, filter bags mainly adopt fiber filter media, because fiber-type filter media have the advantages of a large surface area, fluffy volume and easy-for-processing, which occupy main market of filter media at that time, with commonly used ones being glass fiber, ceramic fiber and metal fiber. Among them, glass fiber and ceramic fiber have the advantages of well high-temperature resistance and corrosion resistance, but with poor wear resistance and folding resistance, which affects service life of filter bags; while metal fiber overcomes these weaknesses, but has weak back-blowing performance, which results in short cleaning cycle of filter bags, besides, its cost is high due to fiber manufacturing. With development of new filter media, composite filter media have become research hotspots in recent years, which are made by compositing different materials together to bring into play their respective advantages and to obtain high filtration efficiency, low resistance and high-temperature resistance, and usually are made by compositing organic materials with woven or glass fiber filter media. Such organic composite filter bags are low-cost for manufacturing and easy to install, and are widely used in dust removal industry, but limitations of their materials also limit the scope of their use scenarios. For filter bags, when working temperature exceeds 200° C., a situation of "burned-through holes" will appear, and if gas contains oil substances, another situation of "paste bag" will appear, both of which will affect filtering area and back-blowing effect. While metal filter elements used in mainstream market have good high-temperature resistance and are not affected by filtering composition, their thickness designs make them have high filtration resistance and low flux under low-pressure environment, which cannot meet requirements for high-flux soot filtration; however, metal materials still show outstanding advantages over other kinds of materials, therefore, tackling the defects of metal filter elements in filtration resistance and flux capacity, when applied to dedusting filtration, will become a new breakthrough for boiler exhaust gas dedusting.

So far, in view of the shortcomings of filter media of traditional filter bags, there have been related technical research and improvement. In related disclosed patents, for example, disclosure patent No. 201510184601.7, which provides a method for manufacturing a flexible metal membrane filter bag that can handle separation and purification of high-temperature dust-containing gases above 600° C. In that disclosure patent, an elemental metal powder is made into a flexible porous metal membrane by means of sintering, and the flexible porous metal membrane is rolled into a cylinder shape, with one end being welded with a round metal membrane while the other end being used as an opening of a filtering structure. The metal membrane has no support body, but has light weight and low filtration resistance, and overcomes the problem of filter bag blockage due to condensation of sticky dust under high-temperature environment. However, the disclosure patent does not make a special description about corrosion resistance of both the material used to prepare the metal membrane and the metal membrane itself, therefore, filtration effect of the metal membrane is uncertain when dealing with high-temperature soot containing corrosive components. Another example is utility model patent No. 201820937005.0, which provides a metal-filter-membrane dedusting device, with a plurality of metal filter membranes being installed inside the device, and the membranes being made from a mixture of various metal powders by means of sintering. Each of the filter membranes is in a double-layer wavy-plate-type structure, with crests and troughs being arc-shaped, and one end being open, while the other end and both sides being closed, and because of such a wavy-plate-type filter membrane structure, its filtering area is increased. Inside the metal filter membrane, a pressure-equilibrium tube is provided, which can balance pressure of the filter membrane through pressure-equilibrium holes provided at a bottom of the tube, thus reducing filtration resistance and prolong service life of the metal membrane. Although the utility model patent solves the usage defects of dedusting filter components under low-pressure working condition, it requires adding auxiliary fittings to balance pressure, which increases cost of equipment and difficulty of installation; moreover, the structure design of the metal membrane requires a relatively-high-precision preparation process, which increases preparation difficulty as well.

SUMMARY

To this end, the present disclosure aims to solve the following technical problems:

1. Studying a metal membrane development process, to solve the defects of high filtration resistance and low flux of existing traditional metal filter elements under low-pressure working environments.

2. Taking advantages of Fe—Al-based intermetallic compound's own high-temperature and corrosion resistance characteristics, to solve problems of existing Fe—Al-based metal porous membranes, and to expand scope of applications of metal porous membranes in industrial filtration.

3. Improving preparation process of metal porous membranes, and simplifying related equipment and process flow, to solve the problems of low strength and uneven pores of traditional metal membranes, and to minimize pollution to ensure a clean and environmental friendly preparation process.

4. Changing unitary structure form of existing metal filtration membrane units, and enabling them to be made into a variety of different shapes and structures, to suit different equipment types and filtration requirements.

5. Extending service life of high-flux metal membranes, and improving online back-blowing effect, to save economic costs.

Hence, according to an aspect of the present disclosure, the present disclosure provides a Fe—Al-based metal membrane, characterized in that, the Fe—Al-based metal membrane comprises a sintered Fe—Al-based metal powder membrane layer and a sintered metal substrate layer, wherein, the sintered Fe—Al-based metal powder membrane layer is disposed above the sintered metal substrate layer, and wherein, the sintered Fe—Al-based metal powder membrane layer and the sintered metal substrate layer are obtained, by casting a mixed slurry, which comprises a Fe—Al-based metal powder and an organic-additive-added water-based solvent, into a membrane green body on the metal substrate layer by a casting machine, and then performing degreasing, sintering, and alloy phase ordering treatments.

According to another aspect of the present disclosure, the present disclosure provides a method for preparing a Fe—Al-based metal membrane, characterized in that, the method comprises the steps of: stirring and defoaming a mixture composed of a Fe—Al-based metal powder and an organic-additive-added water-based solvent, thus obtaining a cast slurry; casting a uniform membrane layer on a metal substrate layer having a required thickness on a casting machine, and performing drying treatment on it, thus obtaining a membrane green body; and placing the dried membrane green body in a sintering furnace for degreasing, sintering, and alloy phase ordering treatments, respectively, thus obtaining a prepared Fe—Al-based metal membrane, wherein, the degreasing treatment is a treatment to remove the organic additive.

The present disclosure develops a Fe—Al-based metal membrane that has high flux and can be applied at high-operating-temperature, low-working-pressure and low-outlet-solids-content working conditions. The metal membrane is a composite of a metal substrate layer (such as a metal substrate membrane or a metal wire mesh) and a Fe—Al-based metal powder membrane layer, and is prepared by a cast-molding method combined with a vacuum sintering process that results in a Fe—Al-based metal porous membrane with high filtration accuracy, high flux, low drop resistance, and good back-blowing effect. The above-mentioned metal substrate membrane or metal wire mesh is preferably made of one material selected from 304, 316L, 310S and FeCrAl, and the Fe—Al-based metal powder is preferably one selected from FeAl, $Fe_3Al$ and FeCrAl powders, with a particle size ranging preferably between −300 mesh and −500 mesh. Fe—Al intermetallic compounds have the properties of high-temperature and corrosion resistance and low cost, but their characteristic of room-temperature brittleness limit their applications in the field of metal porous membranes. The inventor's research also found that, this defect concerning application of Fe—Al-based compound materials in the field of metal membranes can be effectively ameliorated by way of elemental compounding, therefore, the present disclosure chooses FeCrAl powders as one option for powder raw materials, to enhance strength and toughness of high-flux membranes.

A Fe—Al-based metal powder is mixed with a cast solvent (i.e., an organic-additive-added water-based solvent) by stirring, thus obtaining a uniform and stable cast slurry, then the cast slurry is placed in a casting machine where a metal substrate membrane or a metal wire mesh is laid flat on a base plate of the casting machine. To control a thickness of a cast membrane layer, the casting machine is adjusted appropriately for a doctor blade spacing and a casting speed, and after setting proper casting parameters, the casting machine is started to cast a membrane layer with a flat surface and uniform thickness on the metal substrate membrane or the wire mesh substrate, which is then placed in open air for drying. Thereafter, the dried membrane green body is put into a vacuum sintering furnace for degreasing, sintering and alloy phase ordering treatments respectively, and after cooling, a high-flux Fe—Al-based metal membrane is obtained.

Different from traditional cast-molding technology, the present disclosure prepares a slurry by adding a small amount of organic additive in a water-based solvent, which not only avoids pollution of an organic solvent to the environment and equipment, but also effectively ameliorates performance deficiency of a membrane material caused by incomplete removal of organic substances from a porous membrane, thus it is one of the innovative techniques of the present disclosure. The organic additive in the water-based solvent of the present disclosure include one or more selected from vinyl alcohol, polyethylene glycol, propanetriol, methyl cellulose, and dibutyl phthalate.

For sintering, a heating-up procedure is designed according to characteristics of adopted materials. A first stage is heating up to 250-350° C. and retaining temperature, to remove the small amount of moisture contained in the cast membrane layer, so as to preclude influence of organic substances on performance of filter medium in subsequent formation processes. A second stage is heating up to 400-450° C. and retaining temperature, to further remove organic binder in the cast membrane, so as to eliminate influence of organic substances on performance of the filter medium. A third stage is heating up to 1000-1200° C., to form sintering necks between powder pores, so that the powder membrane layer is closely composited with the wire-mesh membrane layer. Thereafter, the sintered membrane is cooled with the furnace, and discharged from the furnace after air-cooling.

According to the above described preparation scheme, the metal membrane of the present disclosure has the following advantages:

1. High Filtration Accuracy, Low Filtration Resistance, and High Flux.

Through tests on pore characteristics of the metal membrane and comparisons with filtration performance of traditional filter media, it is obtained that the metal membrane has an average pore size kept in the range of 10-20 μm, and filtration accuracy up to that of an asymmetric powder filter element. In addition, because of a small thickness of the metal membrane, which is controlled in the range of 0.35-0.45 mm, the membrane has a relatively high aeration and a relatively low initial pressure drop, with permeability coefficient reaching up to 20,000 cc/(min*cm2*120 mmHg).

2. Resistance Against High-Temperature Oxidation and Corrosion.

Experiments have been carried out to compare oxidation and corrosion rates of Fe—Al-based compounds with those of several other metals or alloy materials (such as 310S, 316L, Monel, etc.) under the same conditions. Results show that Fe—Al-based compounds have oxidation weight gain rates of about 1/36 of that of Monel400 at a high temperature of 350-450° C., which are lower than those of the several other materials; and their corrosion weight gain rates are kept at a lower level than those of the several other alloys, and basically do not change with time.

3. Good Back-Blowing Effect, Long Service Life, and Favorable Overall Economic Benefits.

Through experimental tests and actual production applications, it is shown that a powder-and-wire-mesh composite high-flux metal membrane has a back-blowing cleaning cycle of more than 50% longer than those of traditional dust-removal organic filter bags, and does not occur "burned-through bag", "paste bag" or other problems during its use, with its service life of more than 5 times those of traditional filter bags, and its overall operating cost lower than those of organic filter bags, and therefore has favorable overall economic benefits.

DETAILED DESCRIPTION

Figure 1:
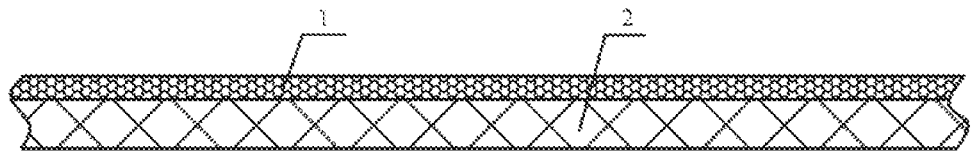
FIG. 1 is a diagram of a cross-sectional structure of a Fe—Al-based metal membrane in accordance with the present disclosure.

Hereinafter, the present disclosure will be described in detail with reference to the accompanying drawings, in which same or similar reference numerals indicate same or similar components.

FIG. 1 is a diagram of a cross-sectional structure of a Fe—Al-based metal membrane in accordance with the present disclosure. As shown in FIG. 1, the Fe—Al-based metal membrane of the present disclosure comprises a sintered Fe—Al-based metal powder membrane layer 1 and a sintered metal substrate layer 2, wherein, the sintered Fe—Al-based metal powder membrane layer 1 is disposed above the sintered metal substrate layer 2, and the metal substrate layer 2 may be in the form of, for example, a metal substrate membrane or a metal wire mesh; and wherein, by casting a mixed slurry comprising a Fe—Al-based metal powder and an organic-additive-added water-based solvent onto the metal substrate layer 2 by a casting machine to form a membrane green body, and drying, then performing degreasing, sintering, and alloy phase ordering treatments on the dried membrane green body (wherein, the degreasing treatment is to remove the organic additive), thereby obtaining a sintered Fe—Al-based metal membrane of the present disclosure comprising the sintered Fe—Al-based metal powder membrane layer 1 and the sintered metal substrate layer 2 in an integral form.

The above-mentioned metal substrate membrane or metal wire mesh is preferably made of one material selected from 304, 316L, 310S and FeCrAl, and the Fe—Al-based metal powder is preferably one selected from FeAl, Fe$_3$Al and FeCrAl powders, with a particle size preferably ranging between −300 mesh and −500 mesh.

The organic additive added in the water-based solvent preferably include one or more selected from vinyl alcohol, polyethylene glycol, propanetriol, methyl cellulose, and dibutyl phthalate.

Figure 2:
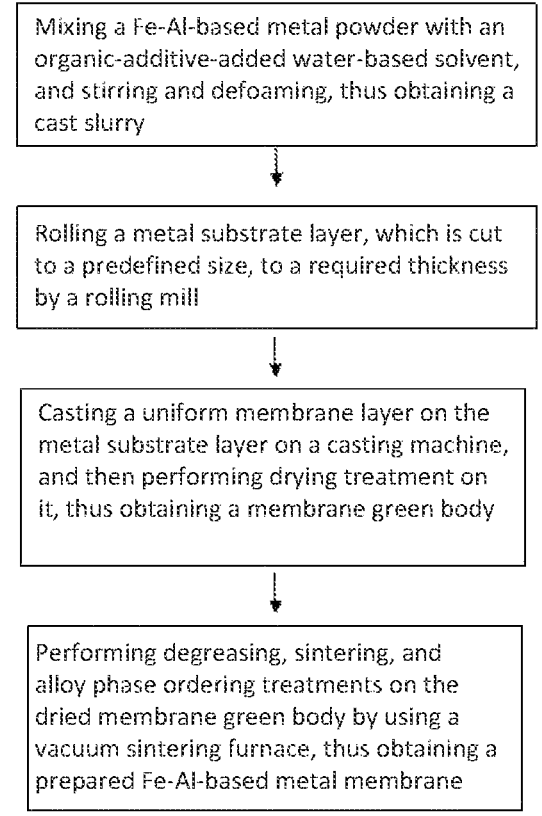
FIG. 2 is a flow chart of a method for preparing a Fe—Al-based metal membrane in accordance with the present disclosure.

FIG. 2 is a flow chart of a method for preparing a Fe—Al-based metal membrane in accordance with the present disclosure. As shown in FIG. 2, the preparation method of the present disclosure is specifically as follows.

1. Preparing a Slurry:

stirring and defoaming a mixture composed of a Fe—Al-based metal powder and an organic-additive-added water-based solvent, thus obtaining a cast slurry.

Wherein, the Fe—Al-based metal powder is preferably a FeAl, Fe$_3$Al or FeCrAl powder, with a particle size preferably ranging between −300 mesh and −500 mesh; the organic additive is preferably one or more selected from methyl cellulose, vinyl alcohol, propanetriol, polyethylene glycol, and dibutyl phthalate.

2. Rolling a Metal Substrate Layer:

cutting a metal substrate layer, such as a metal substrate membrane or a metal wire mesh, to a predefined size, and rolling the metal substrate layer to a required thickness by using a rolling mill, with the metal substrate layer flatness kept below 0.05 mm. The metal substrate layer is preferably made of one material selected from 304, 316L, 310S and FeCrAl.

3. Forming a Membrane Green Body:

adjusting operating parameters of a casting machine, laying the metal substrate layer flat on a base plate of the casting machine, then starting the casting machine to cast a membrane layer on a surface of the metal substrate layer, and performing drying treatment on it to form a membrane green body. The membrane layer has a flat surface and uniform thickness, and the above drying treatment may be air drying carried out at room temperature.

4. Sinter Molding:

performing degreasing, sintering and alloy phase ordering treatments on the dried membrane green body respectively, and discharging it from a furnace after cooling.

The above sinter molding process specifically can be done by placing the dried membrane green body in a vacuum sintering furnace and then performing the above-mentioned treatments on it, wherein the degreasing treatment is a treatment to remove the organic additive.

In the above sinter molding process, a heating-up procedure may be designed according to characteristics of adopted materials. Preferably, a first stage is heating up to 250-350° C. and retaining temperature, to remove the small amount of organic substances contained in the cast membrane layer, so as to preclude influence of organic substances on performance of filter medium (i.e., the Fe—Al-based metal membrane) in subsequent formation processes. A second stage is heating up to 400-450° C. and retaining temperature, to further remove organic binder in the cast membrane, and to promote formation of a porous structure of the Fe—Al-based intermetallic compound. A third stage is heating up to 1000-1200° C., to form sintering necks between powder pores, so that the powder membrane layer is closely composited with the wire-mesh membrane layer.

It should be noted that, the aforementioned step of using a rolling mill to roll a metal wire mesh is not essential in the present disclosure, and it is also possible to directly use a metal wire mesh having a required thickness.

Furthermore, to further describe the method for preparing a Fe—Al-based metal membrane in accordance with the present disclosure, specific examples of the Fe—Al-based metal powder in the forms of FeAl, $Fe_3Al$ and FeCrAl metal powders respectively are given below.

Example 1

1. Preparing a slurry: mixing a −500 mesh FeAl powder with an organic-additive-added water-based solvent in a ratio of 1:2.5 for more than 1 h to form a slurry, and defoaming the slurry to make it ready for use. The organic additive is one or more selected from methyl cellulose, vinyl alcohol, propanetriol, polyethylene glycol, and dibutyl phthalate.

2. Rolling a wire mesh: rolling a 316L stainless steel wire mesh, which is cut to a size of 320*630 mm, to a thickness of 0.1-0.2 mm, with flatness kept below 0.05 mm.

3. Cast molding: adjusting a casting machine to have a blade spacing of 0.5-0.7 mm for a front blade and 0.4-0.6 mm for a back blade, and a casting speed of 0.01-0.2 mm/s, and setting a preheating temperature of 45-55° C. for zone 1 and 50-60° C. for zones 2 and 3; putting the wire mesh under the blades and securing it on a base plate of the casting machine, adding the slurry and then casting to form a wire-mesh membrane, then, after drying, sweeping off remaining powder on the membrane, checking whether there are any holes or cracks, if no, then conducting a second casting, and after completion of the casting, placing the membrane in open air to dry.

4. Vacuum sintering: placing the wire-mesh membrane into a vacuum sintering furnace, and heating up to 250-350° C. and retaining temperature for 1 h, to remove a small amount of organic substances in the membrane, then, continuing heating up to 400-450° C. and retaining temperature for 1 h, to react to form a uniform porous structure, and then heating up to 1000-1200° C. and retaining temperature for 3 h, to form sintering necks between powder pores, thereafter, cooling the sintered body with the furnace and discharging it from the furnace after air-cooling.

Example 2

1. Preparing a slurry: mixing a −500 mesh $Fe_3Al$ powder with an organic-additive-added water-based solvent in a ratio of 1:3 for more than 1 h to form a slurry, and defoaming the slurry to make it ready for use. The organic additive is one or more selected from methyl cellulose, vinyl alcohol, propanetriol, polyethylene glycol, and dibutyl phthalate.

2. Rolling a wire mesh: rolling a 310S stainless steel wire mesh, which is cut to a size of 500*800 mm, to a thickness of 0.1-0.2 mm, with flatness kept below 0.05 mm.

3. Cast molding: adjusting a casting machine to have a blade spacing of 0.5-0.7 mm for a front blade and 0.4-0.6 mm for a back blade, and a casting speed of 0.01-0.2 mm/s, and setting a preheating temperature of 45-55° C. for zone 1 and 50-60° C. for zones 2 and 3; putting the wire mesh under the blades and securing it on a base plate of the casting machine, adding the slurry and then casting to form a wire-mesh membrane, then, after drying, sweeping off remaining powder on the membrane, checking whether there are any holes or cracks, if no, then conducting a second casting, and after completion of the casting, placing the membrane in open air to dry.

4. Vacuum sintering: placing the wire-mesh membrane into a vacuum sintering furnace, and heating up to 250-350° C. and retaining temperature for 1 h, to remove a small amount of organic substances in the membrane, then, continuing heating up to 400-450° C. and retaining temperature for 1 h, to react to form a uniform porous structure, and then heating up to 1000-1200° C. and retaining temperature for 3 h, to form sintering necks between powder pores, thereafter, cooling the sintered body with the furnace and discharging it from the furnace after air-cooling.

Example 3

1. Preparing a slurry: mixing a −500 mesh FeCrAl powder with an organic-additive-added water-based solvent in a ratio of 1:3.3 for more than 1 h to form a slurry, and defoaming the slurry to make it ready for use. The organic additive is one or more selected from methyl cellulose, vinyl alcohol, propanetriol, polyethylene glycol, and dibutyl phthalate.

2. Rolling a wire mesh: rolling a FeCrAl wire mesh, which is cut to a size of 550*1050 mm, to a thickness of 0.2-0.3 mm, with flatness kept below 0.05 mm.

3. Cast molding: adjusting a casting machine to have a blade spacing of 0.4-0.6 mm for a front blade and 0.5-0.7 mm for a back blade, and a casting speed of 0.01-0.2 mm/s, and setting a preheating temperature of 45-55° C. for zone 1 and 50-60° C. for zones 2 and 3; putting the wire mesh under the blades and securing it on a base plate of the casting machine, adding the slurry and then casting to form a wire-mesh membrane, then, after drying, sweeping off remaining powder on the membrane, checking whether there are any holes or cracks, if no, then conducting a second casting, and after completion of the casting, placing the membrane in open air to dry.

4. Vacuum sintering: placing the wire-mesh membrane into a vacuum sintering furnace, and heating up to 250-350°

C. and retaining temperature for 1 h, to remove a small amount of organic substances in the membrane, then, continuing heating up to 400-450° C. and retaining temperature for 2 h, to react to form a uniform porous structure, and then heating up to 700-900° C., to continue reaction and synthesis, and ultimately heating up to 1000-1200° C. and retaining temperature for 3 h, to form sintering necks between powder pores, thereafter, cooling the sintered body with the furnace and discharging it from the furnace after air-cooling.

Example 4

1. Preparing a slurry: mixing a −500 mesh $Fe_3Al$ powder with an organic-additive-added water-based solvent in a ratio of 1:3 for more than 1 h to form a slurry, and defoaming the slurry to make it ready for use. The organic additive is one or more selected from methyl cellulose, vinyl alcohol, propanetriol, polyethylene glycol, and dibutyl phthalate.

2. Rolling a wire mesh: rolling a FeCrAl wire mesh, which is cut to a size of 550*1050 mm, to a thickness of 0.2-0.3 mm, with flatness kept below 0.05 mm.

3. Cast molding: adjusting a casting machine to have a blade spacing of 0.4-0.6 mm for a front blade and 0.5-0.7 mm for a back blade, and a casting speed of 0.01-0.2 mm/s, and setting a preheating temperature of 45-55° C. for zone 1 and 50-60° C. for zones 2 and 3; putting the wire mesh under the blades and securing it on a base plate of the casting machine, adding the slurry and then casting to form a wire-mesh membrane, then, after drying, sweeping off remaining powder on the membrane, checking whether there are any holes or cracks, if no, then conducting a second casting, and after completion of the casting, placing the membrane in open air to dry.

4. Vacuum sintering: placing the wire-mesh membrane into a vacuum sintering furnace, and heating up to 250-350° C. and retaining temperature for 1 h, to remove a small amount of organic substances in the membrane, then, continuing heating up to 400-450° C. and retaining temperature for 2 h, to react to form a uniform porous structure, and then heating up to 700-900° C., to continue reaction and synthesis, and ultimately heating up to 1000-1200° C. and retaining temperature for 3 h, to form sintering necks between powder pores, thereafter, cooling the sintered body with the furnace and discharging it from the furnace after air-cooling.

Finally, it should be noted that, based on the above detailed description of the present disclosure, a person of ordinary skill in the art can fully and clearly envisage similar embodiments for Fe—Al-based metal powders other than FeAl, $Fe_3Al$ and FeCrAl metal powders, therefore, description of them is omitted here.

Apparently, the aforementioned embodiments are merely examples illustrated for clearly describing the present disclosure, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present disclosure.

The invention claimed is:

1. A method for preparing a Fe—Al-based metal membrane, wherein the method comprises the steps of:
   stirring and defoaming a mixture composed of a Fe—Al-based metal powder and an organic-additive-added water-based solvent, thus obtaining a cast slurry;
   casting a uniform membrane layer on a metal substrate layer having a required thickness on a casting machine, and performing drying treatment on it, thus obtaining a membrane green body; and
   placing the dried membrane green body in a sintering furnace for degreasing, sintering, and alloy phase ordering treatments, respectively, thus obtaining a prepared Fe—Al-based metal membrane, wherein, the degreasing treatment is a treatment to remove the organic additive;
   the preparation method further comprises the step of:
   rolling a metal substrate layer, which is cut to a predefined size, to the required thickness by using a rolling mill, with the metal substrate layer flatness kept below 0.05 mm;
   the Fe—Al-based metal powder is FeAl, $Fe_3Al$ or FeCrAl, with a particle size ranging between −300 mesh to −500 mesh; the organic additive is one or more selected from methyl cellulose, vinyl alcohol, propanetriol, polyethylene glycol, and dibutyl phthalate; and the metal substrate layer is made of one material selected from 304, 316L, 310S;
   a metal wire mesh is used as the metal substrate layer.

2. The method according to claim 1, wherein the Fe—Al-based metal powder is a FeAl metal powder with a particle size of −500 mesh, and the FeAl metal powder is mixed with the organic-additive-added water-based solvent in a ratio of 1:2.5; and
   during the treatments in the sintering furnace, a first stage is heating up to 250-350° C. and then retaining temperature, a second stage is heating up to 400-450° C. and then retaining temperature, and a third stage is heating up to 1000-1200° ° C. and then retaining temperature.

3. The method according to claim 1, wherein the Fe—Al-based metal powder is a $Fe_3Al$ metal powder with a particle size of −500 mesh, and the $Fe_3Al$ metal powder is mixed with the organic-additive-added water-based solvent in a ratio of 1:3; and
   during the treatments in the sintering furnace, a first stage is heating up to 250-350° C. and then retaining temperature, a second stage is heating up to 400-450° C. and then retaining temperature, and a third stage is heating up to 1000-1200° ° C. and then retaining temperature.

4. The method according to claim 1, wherein the Fe—Al-based metal powder is a FeCrAl metal powder with a particle size of −500 mesh, and the FeCrAl metal powder is mixed with the organic-additive-added water-based solvent in a ratio of 1:3.3; and
   during the treatments in the sintering furnace, a first stage is heating up to 250-350° C. and then retaining temperature, a second stage is heating up to 400-450° ° C. and then retaining temperature, a third stage is heating up to 700-900° ° C. and then retaining temperature, and a fourth stage is heating up to 1000-1200° C. and then retaining temperature.

5. A Fe—Al-based metal membrane, wherein the Fe—Al-based metal membrane comprises a sintered Fe—Al-based metal powder membrane layer (1) and a sintered metal substrate layer (2), wherein the sintered Fe—Al-based metal powder membrane layer (1) is disposed above the sintered metal substrate layer (2), and
   the sintered Fe—Al-based metal powder membrane layer (1) and the sintered metal substrate layer (2) are obtained, by casting a mixed slurry, which comprises a Fe—Al-based metal powder and an organic-additiveadded water-based solvent, into a membrane green body on the metal substrate layer (2) by a casting machine, and then performing degreasing, sintering, and alloy phase ordering treatments;

the Fe—Al-based metal powder is FeAl, $Fe_3Al$ or FeCrAl, with a particle size ranging between −300 mesh to −500 mesh; the organic additive is one or more selected from methyl cellulose, vinyl alcohol, propanetriol, polyethylene glycol, and dibutyl phthalate; and the metal substrate layer is made of one material selected from 304, 316L, 310S;

the metal substrate layer is metal wire.

* * * * *